United States Patent [19]

Schupner

[11] 3,997,037
[45] Dec. 14, 1976

[54] ADJUSTABLE SHOCK ABSORBER

[75] Inventor: Willard J. Schupner, Palatine, Ill.

[73] Assignee: Efdyn Corporation, Chicago, Ill.

[22] Filed: Aug. 5, 1975

[21] Appl. No.: 601,977

[52] U.S. Cl. .................................. 188/315; 16/51; 138/46; 188/285; 188/287; 188/318

[51] Int. Cl.² ........................................... F16F 9/48

[58] Field of Search .......... 188/285, 286, 287, 315, 188/318, 313, 322; 16/51, 52, 66, 84; 138/43, 46

[56] References Cited
UNITED STATES PATENTS

| | | | |
|---|---|---|---|
| 3,425,522 | 2/1969 | Gryglas | 188/315 |
| 3,645,365 | 2/1972 | Domek | 188/285 |
| 3,666,256 | 5/1972 | Ellis et al. | 188/315 X |
| 3,843,107 | 10/1974 | Atkins | 188/287 X |

Primary Examiner—George E. A. Halvosa
Attorney, Agent, or Firm—Darbo, Robertson & Vandenburgh

[57] ABSTRACT

A shock absorber having passageways through which fluid is metered from a primary chamber upon application of an impact force to a piston assembly slidable in the chamber, and an adjustable flow control member for regulating the flow of fluid through the passageways to an accumulator chamber within the flow control member.

7 Claims, 6 Drawing Figures

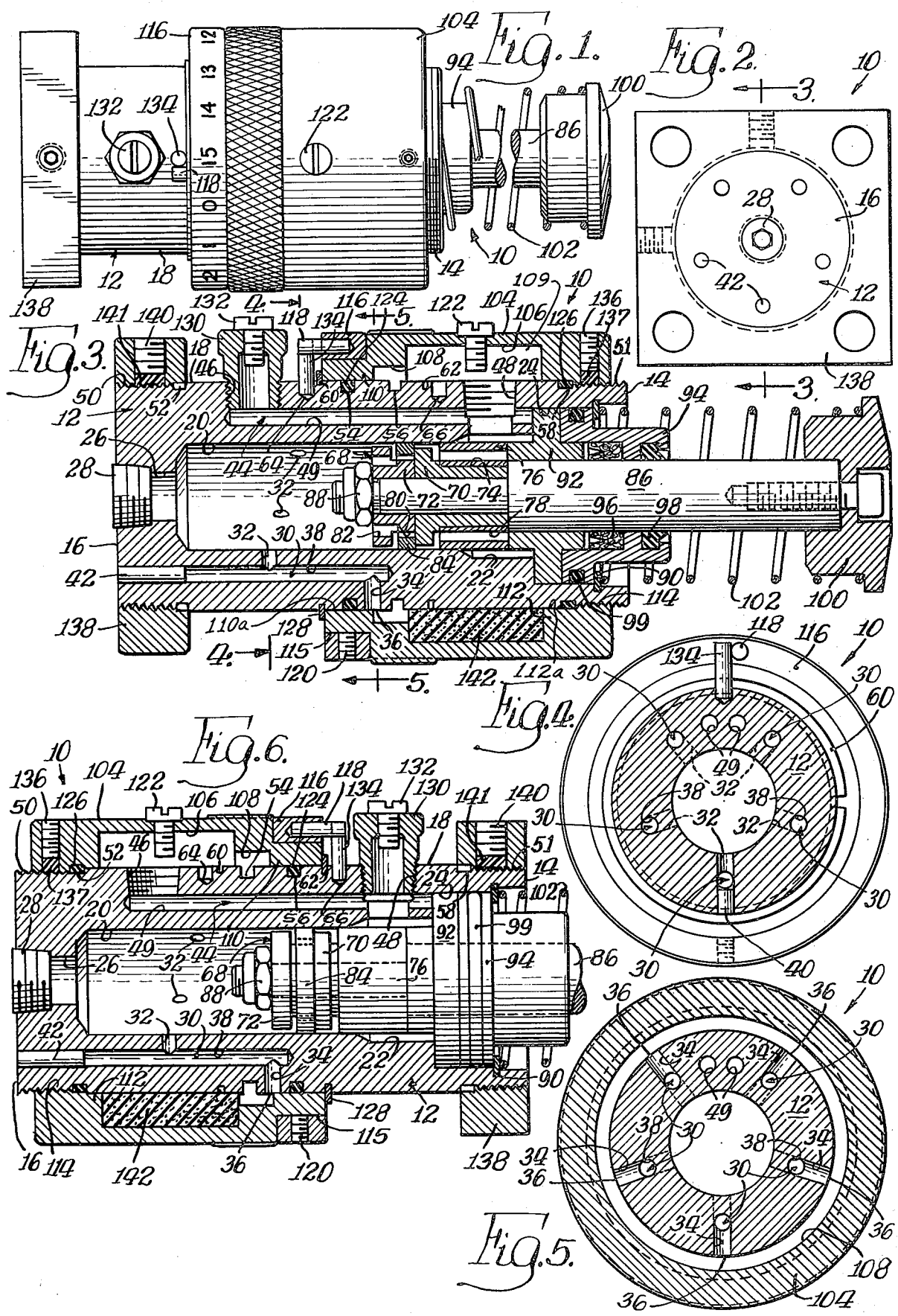

ADJUSTABLE SHOCK ABSORBER

BACKGROUND OF THE INVENTION

1. Field of the Invention

The present invention pertains generally to a hydraulic shock absorber, which is adapted for use, for example, in aircraft, automotive, machine and railroad applications, and which is capable of being adjusted to decelerate loads at different rates.

2. Description of the Prior Art

Hydraulic shock absorbers basically comprise a primary chamber filled with fluid and having slidably mounted therein a piston which is connected to a piston rod adapted to receive impact forces. Heretofore, certain shock absorbers have been provided with metering orifices for thhe primary chamber through which fluid is forced when the shock absorber is under load, and means for regulating the metering orifices. However, such prior constructions have not been as efficient in operation, as durable in service, as compact in construction, as economical to manufacture, and as readily adjustable, as might be desired.

SUMMARY OF THE INVENTION

The shock absorber of the present invention comprises an elongated housing with a forward end and a rearward end and an outer axial surface. Define in the housing is an axial primary chamber. A piston assembly is axially movable within the primary chamber and presents forward and rearward sides; and a piston rod is connected to the piston assembly and extends from the forward side thereof outwardly of the forward end of the housing for receiving impact forces. Formed in the wall of the housing is at least one metering passageway which at its one end is open to the primary chamber on the rearward side of the piston assembly when the latter is in a normal rest position and which at its other end defines an orifice open at the outer surface of the housing.

A flow control member is mounted on the outer surface of the housing. The flow control member defines with the housing an accumulator chamber for communication with the orifice, and has a valve portion associated with the orifice for establishing the effective area thereof. The position of the flow control member and the valve portion thereof is adjustable to vary the effective area of the orifice whereby to regulate the flow of fluid outwardly of the primary chamber through the metering passageway to the accumulator chamber as the piston assembly moves rearwardly in the primary chamber.

The arrangement of the elements of the shock absorber of the present invention, as described generally above and as will be described in greater detail hereinafter, overcomes the disadvantages of prior constructions noted above.

BRIEF DESCRIPTION OF THE DRAWING

FIG. 1 is a side elevational view of the shock absorber of the present invention;

FIG. 2 is an end elevational view of the shock absorber of FIG. 1;

FIG. 3 is a longitudinal sectional view taken substantially along the line 3—3 in FIG. 2 looking in the direction indicated by the arrows;

FIG. 4 is a transverse sectional view taken substantially along the line 4—4 in FIG. 3 looking in the direction indicated by the arrows;

FIG. 5 is a transverse sectional view taken substantially along the line 5—5 in FIG. 3 looking in the direction indicated by the arrows; and FIG. 6 is a longitudinal sectional view corresponding generally to FIG. 3, but shows certain of the elements of the shock absorber mounted in reversed position.

DESCRIPTION OF THE PREFERRED EMBODIMENT

Referring now to the drawing and particularly FIG. 3, the shock absorber 10 of the present invention comprises a housing or body 12 fabricated from an elongated solid cylindrical steel bar. The housing 12 has a forward end 14, a rearward end 16, and an outer cylindrical surface or face 18; and is formed with a central axial bore 20 which defines a primary chamber, or cylinder cavity an enlarged coaxial intermediate bore 22, a further enlarged coaxial forward end bore 24, and a reduced coaxial partially threaded rearward end bore 26. The bores 20, 22 and 24 are bored from the forward end of the housing 12, while the bore 26 is bored and threaded from the rearward end of the housing 12. The rearward end bore 26 is normally closed by a threaded plug 28 which may be removed when it is desired to connect the bore 26 to auxiliary devices such as high pressure instrumentation.

The housing 12 includes a plurality of circumferentially spaced apart metering passageways 30 formed in the wall thereof. Each passageway 30 comprises a radial metering bore 32 (FIGS. 3 and 4) which is open to the primary chamber 20, a radial bore 34 (FIGS. 3 and 5) which defines a metering orifice 36 open at the outer surface 18 of the housing 12, and an axial bore 38 therebetween (FIGS. 3, 4 and 5). The radial bores 32, which are exponentially spaced apart axially in a rearward direction, may be drilled from inside the housing 12 with special tooling, or drilled externally through the housing 12 and the outer ends thereof suitably plugged as shown for example at 40 in FIG. 4. The radial bores 34 are drilled in the same plane at the lengthwise midpoint of the housing 12 preferably but not necessarily at circumferentially equally spaced apart locations. The axial bores 38 are drilled from the rearward end of the housing 12 and the outer end of each is closed with a plug 42 (FIG. 3).

The housing 12 further includes in the wall thereof passageway means 44 which comprises a pair of threaded axially spaced radial ports 46 and 48 (FIG. 3) interconnected by a pair of axial ports 49 (FIGS. 3, 4 and 5). The radial ports 46 and 48 extend to the outer surface 18 of the housing 12, and the radial port 48 extends to the intermediate bore 22 for communication with the primary chamber 20. The radial ports 46 and 48 are bored and threaded from the side of the housing 12, while the axial ports 49 are drilled from the forward end of the housing 12.

The outer surface 18 of the housing 12 is also formed with threaded portions 50 and 51 at the opposite ends thereof, four axially spaced annular seal grooves 52, 54, 56 and 58, a pair of axially spaced annular retaining-ring grooves 60 and 62, and a pair of axially spaced pin apertures 64 and 66.

Mounted for axial movement within the primary chamber 20 is a piston assembly 68 which includes a forward piston section 70 and a rearward piston section 72. The major outer diameters of the piston sections 70 and 72 are slightly less than the inner diameter of the primary chamber 20 to provide annular clearance therebetween. The forward piston section 70 is formed with an annular recess 74 in which is seated a collar member 76 having a plurality of circumferentially spaced apart axial ports 78. The rearward piston section 72 is formed with an annular groove 80 which communicates with axial ports 82 opening at the rearward side of the piston section 72. Arranged within the groove 80 is a floating piston ring 84 which is narrower than the width of the groove 80 for a purpose to be described hereinafter.

The piston sections 70 and 72 are secured on the inner end of a piston rod 86 by means of a nut 88, and the piston rod 86 extends from the forward side of the piston assembly 68 outwardly of the forward end 14 of the housing 12 for receiving impact forces. Secured in the forward end bore 26, by a snap ring 90, are a piston rod bearing 92 and an end cap 94. Supported within the end cap 94 are an annular seal 96 and an annular wiper 98 which engage the outer periphery of the piston rod 86 and provide a fluid seal during axial sliding movement of the latter. A seal ring 99 is also provided between the end cap 94 and the end bore 26. The outer end of the piston rod 86 has secured thereon a bumper cap 100. Interposed between the snap ring 90 and the bumper cap 100 is a coil spring 102 which biases the piston rod 86 forwardly to dispose the piston assembly 68 in a normal rest position with the collar member 76 engaged against the piston rod bearing 92. The metering passageway bores 32 open to the primary chamber 20 on the rearward side of the piston assembly 68 when the latter is in its normal rest position, and a rearwardmost bore 32 is so arranged that it is closed to the pressure side of the primary chamber 20 at the end of the stroke of the piston rod 86.

Mounted on the outer surface 18 of the housing 12 is an annular sleeve member 104 which serves as a flow control member. The sleeve member 104 is formed with an interior annular face 106 and an annular recess extension or slot 108 which define with the housing 12 an accumulator chamber or cavity 109. The sleeve member 104 at one end presents an annular bearing section 110 defining one side of a slot 108 and which functions as a valve portion, and at its other end presents an annular bearing section 112 having a partially threaded portion 114. The bearing sections 110, 112 have inner cylindrical faces 110a and 112a respectively which ride on the outer cylindrical surface 18 of the body. Secured on a shoulder 115 formed in the bearing section 110 is a graduated ring 116 which carries an axial pin stop 118. The graduated ring 116 is held in place by a set screw 120. The sleeve member 104 is also apertured and provided with a seal screw 122. The sleeve member 104 may be mounted either adjacent the forward end 14 of the housing 12 as shown in FIG. 3, or adjacent the rearward end 16 of the housing 12 as shown in FIG. 6. In either case, the bearing sections 110 and 112 of the sleeve member 104 are supported on and movable along the outer surface 18 of the housing 12.

When the sleeve member 104 is to be mounted as shown in FIG. 3, seal rings 124 and 126 are disposed in the grooves 54 and 58, a retaining ring 128 is disposed in the groove 60, a pipe nipple 130 with a seal screw 132 is threaded in the port 46, and an indicator pin 134 is disposed in the aperture 64. Initially, the threaded portion 114 of the sleeve member 104 is threaded on the forward threaded portion 51 of the housing 12 until the sleeve member 104 abuts the retaining ring 128. In this position of the sleeve member 104, the accumulator chamber 106, 108 communicates with the housing orifices 36, the valve portion 110 is associated with the orifices 36 for establishing the effective area thereof, and the retaining ring 128 limits the axial inward position of the sleeve member 104 and hence determines the maximum effective area of the orifices 36. Then the graduated ring 116 is rotated on the sleeve member 104 until the pin stop 118 abuts the indicator pin 134 with the highest indicia number on the ring 116 aligned with the indicator pin 134, and the ring 116 is locked in place. Next, the sleeve member 104 is rotatably adjusted to dispose the valve portion 110 thereof in a position over the orifices 36 corresponding to the desired effective area of the orifices 36, and the sleeve member 104 is locked in place by a set screw 136 having a nylon tip 137. With the sleeve member 104 mounted adjacent the forward end 14 of the housing 12, a mounting flange 138 may be threaded on the rearward threaded portion 50 of the housing 12, and locked in place by a set screw 140 having a nylon tip 141. When desired, the accumulator chamber 106 may be partially or completely filled with a cellular material 142 which serves as a fluid accumulator. To make the shock absorber 10 operational, it is filled to the desired level with suitable hydraulic fluid. The seal screws 132 and 122 are removable to permit either the addition of fluid to the shock absorber or the bleeding of air therefrom.

In the operation of the shock absorber 10, impact forces received by the bumper cap 100 cause the piston rod 86 and piston assembly 68 to move rearwardly within the primary chamber 20. As rearward movement of the piston assembly 68 commences, pressure initially built up in the hydraulic fluid within the primary chamber 20 rearwardly of the piston assembly 68 causes the floating piston ring 84 to be forced into abutment with the forward piston section 70 thereby preventing hydraulic fluid from flowing therepast. During rearward movement of the piston assembly 68, the hydraulic fluid is forced outwardly of the primary chamber 20, through the duct formed by the bores 32, 38 and 34 and the orifices 36, to the accumulator chamber 106, 108. At the same time, the accumulator chamber 106 communicates through the port 48 with the primary chamber 20 permitting hydraulic fluid to flow to the forward side of the piston assembly 68. Also, the cellular material 142 compresses to compensate for the fluid displaced by the piston rod 86 during its inward stroke.

As the piston assembly 68 moves past and closes off successive metering bores 32, there is a reduction in the number of bores and the associated orifices 36, and hence in the total effective area of the orifices, through which fluid can be displaced from the primary chamber 20. At the beginning of the stroke of the piston rod 86, the total effective area of the orifices available for fluid displacement is at a maximum, while at the end of the stroke, when the piston assembly 68 has moved past all of the bores 32, the total effective area of the orifices available for fluid displacement is zero. Because the bores 32 are of uniform diameter and are axially spaced apart exponentially, because the bores 34 are of uniform diameter arranged in a common plane, and because the individual effective areas of the orifices 36 are uniform, the total effective orifice area available for fluid displacement decreases exponentially with the stroke of the piston assembly.

When the impact force is removed from the bumper cap 100, the spring 102 serves to return the piston rod 86 and piston assembly 68 to the normal rest position shown in FIG. 3. During such forward return motion of the piston assembly 68, the floating piston ring 84 abuts the rearward piston section 72 thereby permitting the free flow of hydraulic fluid past the piston assembly from the forward to the rearward side thereof through the ports 78, the clearance at the periphery of the forward piston section 70, the groove 80, and the ports 82. Thus the hydraulic fluid can flow from the accumulator chamber 109 through the return duct formed by port 48 (or ports 46 and 49 when the apparatus is assembled as in FIG. 6) and intermediate bore 22, and thence past the piston to the primary chamber or cylinder cavity 20.

The rate at which loads are decelerated by the shock absorber 10 is a function of the rate at which fluid is displaced through the metering orifices 36 which in turn is a function of the effective area of the orifices 36. The effective area of each orifice 36 may be varied infinitely (within the range of the device) and uniformly by rotatably adjusting the position of the flow control member 104 and the valve portion 110 thereof. The degree or extent of adjustment of the flow control member 104 per revolution thereof depends upon the number of threads per inch of the threaded portion 51 and the diameter of the bores 34.

When the sleeve member 104 is mounted as shown in FIG. 6, the seal rings 124 and 126 are disposed in the grooves 56 and 52, the retaining ring 128 is disposed in the groove 62, the pipe nipple 130 is threaded in the port 48, and the indicator pin 134 is disposed in the aperture 66. The threaded portion 114 of the sleeve member 104 is threaded on the rearward threaded portion 50 of the housing 12, the graduated ring 116 and the sleeve member 104 are rotatably adjusted as described above in reference to FIG. 3. In this position of the sleeve member 104, the accumulator chamber 106 communicates through the ports 46, 49 and 48 with the primary chamber 20 during the return stroke of the piston rod 86. In all other respects, the shock absorber 10 functions in the same manner as described above in reference to FIG. 3. With the sleeve member 104 mounted adjacent the rearward end 16 of the housing 12, the mounting flange 138 may be threaded on the forward threaded portion 51 of the housing 12.

The shock absorber 10 offers the following advantages: the housing 12 is of one-piece construction fabricated from cylindrical bar stock, and hence eliminates the use of multiple concentric tubes found in prior constructions; the external seal rings 124 and 126 may be assembled with minimum or no damage thereto; the substantial thickness of the housing wall defining the primary chamber 20 enables the shock absorber to withstand relatively high pressures; the metering orifices 36 are radially dispersed and thus present less chance of fatigue crack propogation than orifices arranged axially in-line as in proir constructions; the arrangement of the metering passageways 30 eliminates the use of metering slots and grooves at the surface of the primary chamber 20 which would tend to reduce the strength of the bore 20; the rotatably adjustable flow control member 104 affords convenient orifice adjustment with high stability and low sensitivity; and the flow control member 104 and the mounting flange 138 may be interchanged at the ends of the housing 12 to accommodate different mounting orientations of the shock absorber without disturbance of the internal parts thereof. In sum, the shock absorber 10 is more eficient in operation, more durable in service, more compact in construction, more economical to manufacture, and more readily adjustable, than comparable shock absorbers of the prior art.

While there has been shown and described a preferred embodiment of the present invention it will be understood by those skilled in the art that various rearrangements and modifications may be made therein without departing from the spirit and scope of the invention.

The invention claimed is:

1. A shock absorber comprising an elongated housing with a forward end and a rearward end and an outer axial surface, said housing defining an axial primary chamber therein, a piston assembly axially movable within said primary chamber and presenting forward and rearward sides, a piston rod connected to said piston assembly and extending from said forward side thereof outwardly of said forward end of said housing for receiving impact forces, said housing including a plurality of circumferentially spaced apart metering passageways in the wall thereof each of which at its one end is open to said primary chamber on the rearward side of said piston assembly when the latter is in a normal rest position and each of which at its other end defines an orifice open at said outer surface of said housing, each of said metering passageways comprising a radial bore at said one end, a radial bore at said other end, and an axial bore therebetween, a flow control member mounted on said outer surface of said housing and defining with said housing an accumulator chamber for communication with said orifices and having a valve portion associated with said orifices for establishing the effective area thereof, the position of said flow control member and said valve portion thereof being adjustable to vary the effective area of said orifices whereby to regulate the flow of fluid outwardly of said primary chamber through said metering passageways to said accumulator chamber as said piston assembly moves rearwardly in said primary chamber, being cylindrical and said outer surface being threaded at the opposite ends thereof, said flow control member being an annular sleeve member having internal threads at one end thereof, and said sleeve member being adjustably threaded on one end of said housing.

2. The shock absorber of claim 1 wherein said housing has passageway means in the wall thereof between said primary chamber on the forward side of said piston assembly and said accumulator chamber.

3. The shock absorber of claim 2 wherein said passageway means comprises a pair of axially spaced radial ports interconnected by at least one axial port, both of said radial ports extend to said outer surface of said housing, one of said ports communicates with said primary chamber, and one of said ports communicates with said accumulator chamber while the other of said ports is closed.

4. In an adjustable shock absorber comprising a body member adapted to be fixedly mounted and having a cylinder cavity therein formed about an axis and having a closed end and an open end, a piston movably mounted in said cylinder cavity, an accumulator cavity and means providing an adjustable flow metering duct from the cylinder cavity to the accumulator cavity, said body member having two ends and the piston having a forward side which is normally positioned adjacent one end of the cylinder cavity, said piston being forced into said cavity from said normal position when a shock force is applied thereto, the improvement comprising:
said body member having an exterior face generally surrounding said cylinder cavity, said body member defining return duct means from said accumulator cavity to said one end of the cylinder cavity, said return duct means including two radial ports in said exterior face of said body member and spaced apart in an axial direction and connected by an axial port;
a sleeve member surrounding said face and in annular contact with said exterior face of said body in two planes spaced along said axis and transverse thereto, said sleeve member being rotatable on the body about an axis generally parallel to said cylinder cavity axis and having an inner face, part of said inner face being spaced from said outer face to define said accumulator cavity therebetween, said sleeve member being exposed whereby it may be grasped for manual rotation with respect to the body member, and sleeve member being alternatively mountable on the body member adjacent either of said ends, when said sleeve member is mounted adjacent one of said ends said accumulator cavity being over one of said radial ports with the other radial port being exposed and when said sleeve member is mounted adjacent the other of said ends said accumulator cavity being over the other of said radial ports with said one radial port being exposed
means for closing the exposed radial port; and
said adjustable flow metering duct means comprising one of said faces forming an opening therethrough in communication with one of said cavities, said other face being cylindrical about said rotational axis and having a generally circumferential slot therein which is, at at least most positions of rotation of said sleeve member, overlapping a part of said opening regardless of said alternate position of said sleeve to permit fluid communication between the opening and the slot, said slot being in communication with the other of said cavities whereby communication is established between said cavities through said slot and opening and the overlap therebetween to form said duct, and means for varying the cross-sectional size of a part of the duct at said other face in response to the varied rotational position of the sleeve member on the body member.

5. In an absorber as set forth in claim 4, wherein said body member is threaded adjacent each of said ends and said sleeve member has corresponding threads to engage the body threads at the body member end at which the sleeve member is adjacent, whereby when said sleeve member is rotated it is shifted in an axial direction by the threaded interengagement and thereby the extent of said overlap is varied.

6. In an absorber as set forth in claim 5, wherein said one face is the exterior face of the body member and said slot is in said inner face of the sleeve member.

7. In an absorber as set forth in claim 4, wherein said one face is the exterior face of the body member and said slot is in said inner face of the sleeve member.

* * * * *

UNITED STATES PATENT AND TRADEMARK OFFICE
CERTIFICATE OF CORRECTION

PATENT NO. : 3,997,037
DATED : December 14, 1976
INVENTOR(S) : Willard J. Schupner It is certified that error appears in the above-identified patent and that said Letters Patent are hereby corrected as shown below:

Column 2, line 17, a comma should be inserted after "cavity".
Column 3, line 31, "a" should read --the--.
Column 3, line 42, "a" should be deleted before "slot".
Column 5, line 59, "proir" should read --prior--.
Column 6, line 3, "eficient" should read --efficient--.
Column 6, line 42, --said housing-- should be inserted before "being".
Column 7, line 22, "and" should read --said--.
Column 7, line 31, a semicolon should be inserted after "exposed".

Signed and Sealed this

Twenty-ninth Day of March 1977

[SEAL]

Attest:

RUTH C. MASON
Attesting Officer

C. MARSHALL DANN
Commissioner of Patents and Trademarks